United States Patent [19]

Everett et al.

[11] Patent Number: 5,317,330
[45] Date of Patent: May 31, 1994

[54] DUAL RESONANT ANTENNA CIRCUIT FOR RF TAGS

[75] Inventors: David F. Everett, Gambrills; Daniel C. Buck, Hanover, both of Md.

[73] Assignee: Westinghouse Electric Corp., Pittsburgh, Pa.

[21] Appl. No.: 957,119

[22] Filed: Oct. 7, 1992

[51] Int. Cl.$^5$ .............. H01Q 21/00; G08B 13/24
[52] U.S. Cl. .................... 343/867; 340/572
[58] Field of Search ............ 343/866, 867, 787, 788; 340/505, 572, 573

[56] References Cited

U.S. PATENT DOCUMENTS

| | | | |
|---|---|---|---|
| 3,440,633 | 4/1969 | Vinding | 340/572 |
| 3,618,108 | 11/1971 | Buck | 343/778 |
| 4,464,663 | 8/1984 | Lalezari et al. | 343/700 MS |
| 4,542,532 | 9/1985 | McQuilkin | 455/78 |
| 4,551,712 | 11/1985 | Fockens | 340/572 |
| 4,847,574 | 7/1989 | Gauthier et al. | 33/21 A |
| 4,963,880 | 10/1990 | Torre et al. | 343/866 |
| 5,012,224 | 4/1991 | Drucker | 340/551 |
| 5,055,835 | 10/1991 | Sutton | 340/572 |
| 5,084,699 | 1/1992 | DeMichele | 343/867 |
| 5,099,226 | 3/1992 | Andrews | 340/572 |
| 5,099,227 | 3/1992 | Geiszler et al. | 340/572 |
| 5,241,298 | 8/1993 | Lian et al. | 340/572 |

FOREIGN PATENT DOCUMENTS 0084400  7/1983  European Pat. Off. ............ 340/572

Primary Examiner—Donald Hajec
Assistant Examiner—Tan Ho
Attorney, Agent, or Firm—D. G. Maire

[57] ABSTRACT

A two-way communication system is provided having a stationary device and a portable passive device. The portable passive device has circuitry for storing and transmitting coded information. The stationary member transmits a signal at a first frequency via magnetic field and the portable passive device transmits coded information stored on circuitry provided therein at a second frequency also via a magnetic field. An antenna circuit is provided in the portable passive device having a parallel resonant circuit and a series resonant circuit. The parallel resonant circuit derives operating power from the signal at a first frequency for use in the circuitry provided in the portable passive device. The series resonant circuit transmits coded information at a second frequency.

21 Claims, 1 Drawing Sheet

DUAL RESONANT ANTENNA CIRCUIT FOR RF TAGS

BACKGROUND OF THE INVENTION

1. Field Of The Invention

This invention relates to the field of two-way communication devices in which one such device is passive and, more particularly, to two-way communication devices in which one device is a stationary device and the other device is a portable passive device.

2. Description Of Related Art

It is well known to use two-way communication devices utilizing a stationary member and a portable passive member. Such portable passive members are generally radio frequency (RF) tags. An RF tag uses radio frequency energy to remotely identify itself to a reader, which may be several inches to many feet away. The tag may be mounted on a container for cargo management or carried by a person for security access. It is preferable that the tag not only be extremely inexpensive but also rugged and reliable.

FIG. 1 shows a typical RF tag system known in the prior art. Therein, a reader 10 and tag 12 engage in two-way communication. Power 14 is imported into reader 10 and transmitted as RF energy signal 16 to tag 12. After processing by tag 12, tag 12 transmits RF modulated signal 18 which is received by reader 10. Utilizing this RF modulated signal 18, reader 10 obtains tag ID code 20 which allows it to identify tag 12.

For security access applications, low frequency tags having a frequency less than one MHz are preferred. Such tags provide the advantage of permitting through-the-body operation and easy clock generation. For short read ranges on the order of three feet or less, such a tag operates without a battery, using only the energy absorbed from the reader's RF field. The energy is coupled from the reader to the tag magnetostatically. This coupling is a near-field phenomenon which is analogous to an air core transformer having a very low coupling coefficient.

Since there is no external power supply in the circuit from the reader antenna to the tag and back to the reader, the signal level returning from the tag to the reader is much lower than the transmitted signal from the reader. It has been found that in the three foot read range, the returning signal from tag to reader is more than 80 dB less than the transmitted signal from the reader to the tag. This large signal differential requires a large dynamic range in the reader receiver or a frequency conversion in the tag so that the received frequency at the tag is different from the transmitted frequency. Frequency conversion enables front-end filtering in the receiver of the transmitted frequency. At the low frequencies desired for RF tag operation, frequency conversion is a simple function performed by digital circuitry. Accordingly, a dual frequency RF tag system is desirable.

The power received at the tag may be extremely low. It is not infrequent for such power to be less than 100 μW. However, this is enough power to operate a digital CMOS integrated circuit as long as a relatively large voltage in the range of greater than 3 volts is generated. In order to conserve power in the tag, the voltage needed to transmit the signal from the tag should be minimized. Consequently, there is a need for an antenna circuit capable of deriving large voltages from the reader signal but conserving power in the transmission of the return signal.

SUMMARY OF THE INVENTION

A two-way communication system is provided having a stationary member and a portable passive member having circuitry for storing and transmitting coded information. The stationary member transmits a signal at a first frequency by means of a magnetic field. The portable passive member transmits coded information stored on its circuitry at a second frequency also via a magnetic field. An antenna circuit is provided in the portable passive member which is parallel resonant at the receive frequency and series resonant at the transmit frequency.

The parallel resonant circuit of the antenna circuit derives operating power from the signal transmitted by the stationary member. The parallel resonant circuit presents a high impedance resulting in a large voltage with small current flow. The series resonant circuit transmits the coded information at a second frequency which differs from the first frequency. The series resonant circuit presents a low impedance which results in a large current with a small applied voltage. The series resonance minimizes the effect of the transmitted signal on the receive signal, enabling simultaneous transmit and receive operations from the portable passive member through the same antenna circuit.

DETAILED DESCRIPTION OF THE PREFERRED EMBODIMENTS

Figure 1:
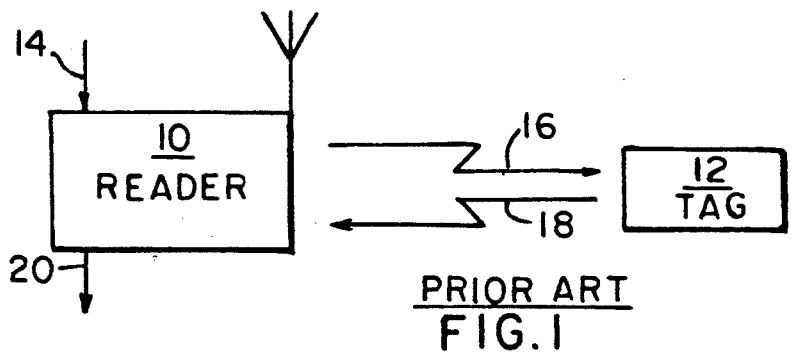
FIG. 1 is a schematic representation of a prior art RF tag system.
Figure 2:
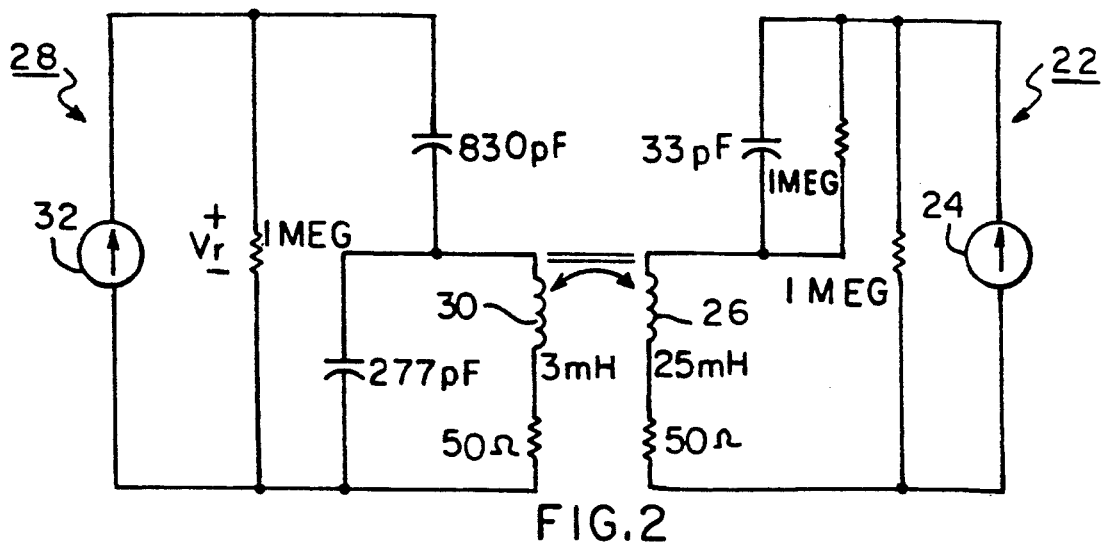
FIG. 2 is a schematic representation of a two-way communication system of the present invention showing the reader transmitter and the tag receive and transmit circuit.

FIG. 2 represents a typical reader transmit circuit and tag receive and transmit circuit in accordance with the present invention. In FIG. 2, reader 22 transmits a signal at a first frequency. Reader transmitter 24 generates a current at a desired frequency. Coil antenna 26 generates a magnetic field at the desired frequency.

When tag 28 approaches reader 22, the magnetic field generated by coil antenna 26 is received by inductor antenna 30. The circuitry in tag 28 derives power from this received signal and generates a received voltage represented by Vr. This received voltage is used to operate tag transmitter 32 which produces a signal at a second frequency. This signal is transmitted by tag 28 by means of an inductor antenna 30.

Figure 3:
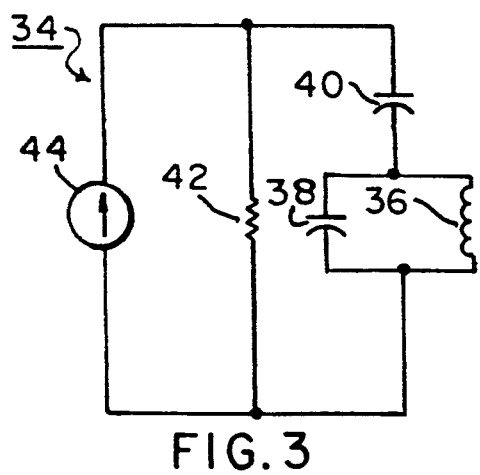
FIG. 3 is a schematic representation of a first presently preferred embodiment of the dual frequency antenna circuit of the present invention.
Figure 4:
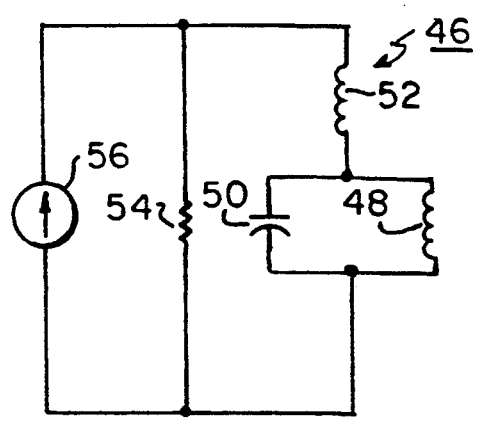
FIG. 4 is a schematic representation of a second presently preferred embodiment of the dual frequency antenna circuit of the present invention.

FIGS. 3 and 4 show two possible configurations of the dual frequency antenna circuit of the present invention. In FIG. 3, tag 34 is shown having transmit and receive antenna 36 provided in parallel alignment with a first capacitor 38. Antenna 36 and capacitor 38 are designed to create a parallel resonance at the frequency of the receive signal. A second capacitor 40 is provided in serial alignment with the parallel combination of capacitor 38 and antenna 36. As long as load impedance 42 is substantially greater than the impedance of capacitor 40 at the frequency of the received signal, little voltage is lost across capacitor 40. The received voltage is large enough to drive transmitter 44 which produces a signal containing the coded information at a lower frequency than the signal received by tag 34.

In the dual frequency antenna circuit of FIG. 3, the parallel resonant circuit created by antenna 36 and first capacitor 38 produces a high impedance which creates a large voltage and a small flow of current at the tag receive frequency. The series resonant circuit formed by the parallel combination of antenna 36 and capacitor 38 in serial alignment with capacitor 40 presents a low impedance, which results in a large current having a small applied voltage at the tag transmit frequency. By utilization of the dual resonant antenna circuit of FIG. 3, antenna 36 transmit a signal of coded information at a frequency less than the frequency of the signal which it receives.

In contrast to the dual resonant circuit of FIG. 3, the dual resonant antenna circuit of FIG. 4 transmits a signal of coded information at a higher frequency than the signal received. In the dual antenna circuit of FIG. 4, tag 46 is provided with antenna 48 which receives the signal generated by the reader. Capacitor 50 is provided in parallel alignment with antenna 48 to form the parallel circuit. The parallel combination of the capacitor 50 and antenna 48 are provided in serial alignment with transmit antenna 52 to form the serial circuit of the dual resonant circuit.

In the configuration of FIG. 4, all of the transmit current flows through antenna 52. However, only some of the current passes through antenna 48. Because most of the received voltage is developed across antenna 48, antennas 48 and 52 separate the receive and transmit functions, respectively. As long as the receive load impedance 54 is substantially greater than the impedance of antenna 52, little voltage will be lost across antenna 52.

The parallel resonant circuit formed by antenna 48 and capacitor 50 presents a high impedance which results in a large voltage with small current flow at the tag receive frequency. The series resonant circuit formed by the parallel combination of receive antenna 48 and capacitor 40 in serial alignment with antenna 52 presents a low impedance, resulting in a large current with a small applied voltage at the tag transmit frequency. This allows transmitter 56 to transmit a signal at a higher frequency than that received from the reader.

In the configuration of both FIGS. 3 and 4, the antenna circuit can be modified by placing the load impedance 42, 54 connected across only the parallel resonant circuits. Such a modified configuration eliminates the voltage drop occurring over the series element. However, the received signal will have a strong transmit component which must be filtered in order for such a configuration to operate properly.

The present dual resonant antenna circuit provides both a cost reduction and a size reduction in the production of the tag. Because such tags are generally planar in shape, the use of a single antenna circuit permits the tag to be generally in the size of a credit card. The use of the dual circuit and single antenna prevents the problem of the receive antenna and transmit antenna talking to each other.

A simulation was conducted of the dual resonant antenna circuit of FIG. 2. That simulation showed that the transmitted current from tag transmitter 32 has little effect on the received voltage, Vr. This is true even when the current in the antenna coil due to the transmitter is as large as the antenna coil current from the received signal. In the simulated antenna circuit, reader transmitter 24 creates a current of 50 mA and creates a frequency of 175 kHz. The tag transmitter 32 creates a current of 500 $\mu$A and operates at a frequency of 87.5 kHz. The values of the remaining elements in the simulation are shown beside the respective element in FIG. 2. In the simulation of the dual antenna circuit of FIG. 2, the received voltage varied by less than 5% due to the transmitted current. Thus, the provision of the transmit and receive functions on the same circuit is practical.

The present dual resonant antenna circuit may also be used in any communication system having an active member and at least one passive member. In such a communication system, the passive members derive their operating power from the magnetic field generated by the active member. The parallel resonant circuit provided in the passive members is resonant at the transmit frequency of the active member and derives operating power from the active member's magnetic field. This operating power is used to transmit a signal using the passive member's serial resonant circuit.

The present dual resonant antenna circuit may further be used in a communication system having two active members. In such a communication system, the parallel resonant circuit of each active member is resonant at the frequency of the other active member's transmit frequency. By utilization of the dual resonant circuit, simultaneous transmit and receive operations may be conducted through a single antenna in each member. Such a communication system is ideally suited for use in walkie-talkie devices and in toys.

In the foregoing specification certain preferred practices and embodiments of this invention have been set out, however, it will be understood that the invention may be otherwise embodied within the scope of the following claims.

We claim:

1. In a two-way communication system having a stationary member and a portable passive member, said portable passive member having circuitry for storing and transmitting coded information, said stationary member transmitting a signal at a first frequency via a magnetic field and said portable passive member transmitting coded information stored by said circuitry in said portable passive member at a second frequency via a magnetic field, the improvement comprising an antenna circuit provided in said portable passive member, said antenna circuit comprising:

(a) a parallel resonant circuit having a receive antenna for deriving operating power from said signal at a first frequency for use in said circuitry provided in said portable passive member; and
    (b) a series resonant circuit having a transmit antenna for transmitting at a second frequency said coded information stored by said circuitry in said portable passive member, said second frequency differing from said first frequency.

2. The antenna circuit of claim 1 wherein said parallel resonant circuit comprising a first capacitor in parallel alignment with an inductor coil, said inductor coil serving as the receive antenna for said portable passive member.

3. The antenna circuit of claim 2 wherein said series resonant circuit comprises a second capacitor in serial alignment with the parallel combination of said inductor coil and said first capacitor, said inductor coil serving as the transmit antenna for said portable passive member.

4. The antenna circuit of claim 1 wherein said series resonant circuit comprises a first capacitor in serial alignment with a parallel combination of a second capacitor and an inductor coil, said inductor coil serving as the transmit antenna for said portable passive member.

5. The antenna circuit of claim 1 wherein said parallel resonant circuit comprises a capacitor in parallel alignment with a first inductor coil, said first inductor coil serving as the receiving antenna for said portable passive member.

6. The antenna circuit of claim 5 wherein said series resonant circuit comprises a second inductor coil in serial alignment with the parallel combination of said first inductor coil and said capacitor, said second inductor coil serving as a transmit antenna for said portable passive member.

7. The antenna circuit of claim 1 wherein said series resonant circuit comprises a first inductor coil in serial alignment with a parallel combination of a second inductor coil and a capacitor, said first inductor coil serving as a transmit antenna for said portable passive member.

8. In a communication system having an active member and at least one passive member, said active member transmitting a signal at a first frequency via a magnetic field and said at least one passive member transmitting a signal at a second frequency via a magnetic field, the improvement comprising an antenna circuit provided in said at least one passive member, said antenna circuit comprising:
   (a) a parallel resonant circuit having a receive antenna for deriving operating power from said signal at a first frequency for use in said passive member; and
   (b) a series resonant circuit having a transmit antenna for transmitting said signal at a second frequency, said second frequency differing from said first frequency.

9. The antenna circuit of claim 8 wherein said parallel resonant circuit comprises a first capacitor in parallel alignment with an inductor coil, said inductor coil serving as the receive antenna for said at least one passive member.

10. The antenna circuit of claim 9 wherein said series resonant circuit comprises a second capacitor in serial alignment with the parallel combination of said inductor coil and said first capacitor, said inductor coil serving as the transmit antenna for said at least one passive member.

11. The antenna circuit of claim 8 wherein said series resonant circuit comprises a first capacitor in serial alignment with a parallel combination of a second capacitor and an inductor coil, said inductor coil serving as the transmit antenna for said at least one passive member.

12. The antenna circuit of claim 8 wherein said parallel resonant circuit comprises a capacitor in parallel alignment with a first inductor coil, said first inductor coil serving as the receive antenna for said at least one passive member.

13. The antenna circuit of claim 12 wherein said series resonant circuit comprises a second inductor coil in serial alignment with the parallel combination of said first inductor coil and said capacitor, said second inductor coil serving as a transmit antenna for said at least one passive member.

14. The antenna circuit of claim 8 wherein said series resonant circuit comprises a first inductor coil in serial alignment with a parallel combination of a second inductor coil and a capacitor, said first inductor coil serving as a transmit antenna for said at least one passive member.

15. In a two-way communication system having two active members, one of said active members transmitting a signal at a first frequency via a magnetic field and the other of said active members transmitting a signal at a second frequency via a magnetic field, the improvement comprising an antenna circuit provided in each of said active members, said antenna circuit comprising:
   (a) a parallel resonant circuit having a receive antenna for receiving a signal, said parallel resonant circuit being resonant at the frequency of the signal transmitted by the other active member; and
   (b) a series resonant circuit having a transmit antenna for transmitting a signal at a frequency differing from said frequency of the received signal, said series resonant circuit being resonant at the frequency of the transmitted signal.

16. The antenna circuit of claim 15 wherein said parallel resonant circuit comprises a first capacitor in parallel alignment with an inductor coil, said inductor coil serving as the receive antenna for each said active member.

17. The antenna circuit of claim 16 wherein said series resonant circuit comprises a second capacitor in serial alignment with the parallel combination of said inductor coil and said first capacitor, said inductor coil serving as the transmit antenna for each said active member.

18. The antenna circuit of claim 15 wherein said series resonant circuit comprises a first capacitor in serial alignment with a parallel combination of a second capacitor and an inductor coil, said inductor coil serving as the transmit antenna for each said active member.

19. The antenna circuit of claim 15 wherein said parallel resonant circuit comprises a capacitor in parallel alignment with a first inductor coil, said first inductor coil serving as the receive antenna for each said active member.

20. The antenna circuit of claim 19 wherein said series resonant circuit comprises a second inductor coil in serial alignment with the parallel combination of said first inductor coil and said capacitor, said second inductor coil serving as a transmit antenna for each said active member.

21. The antenna circuit of claim 15 wherein said series resonant circuit comprises a first inductor coil in serial alignment with a parallel combination of a second inductor coil and a capacitor, said first inductor coil serving as a transmit antenna for each said active member.

* * * * *